(12) United States Patent
Delporte et al.

(10) Patent No.: US 8,050,808 B2
(45) Date of Patent: Nov. 1, 2011

(54) METHOD AND DEVICE FOR LIMITING THE ROLL COMMAND OF AN AIRCRAFT AS A FUNCTION OF A THRUST ASYMMETRY

(75) Inventors: Martin Delporte, Fonsorbes (FR);
Sophie Lambeaux, Tournefeuille (FR);
Didier Ronceray, Pibrac (FR);
Jean-Philippe Legier, Toulouse (FR)

(73) Assignees: Airbus Operations SAS, Toulouse (FR);
Airbus, Blagnac (FR)

( * ) Notice: Subject to any disclaimer, the term of this patent is extended or adjusted under 35 U.S.C. 154(b) by 536 days.

(21) Appl. No.: 12/053,306

(22) Filed: Mar. 21, 2008

(65) Prior Publication Data

US 2008/0234880 A1    Sep. 25, 2008

(30) Foreign Application Priority Data

Mar. 22, 2007  (FR) ..................... 07 02083

(51) Int. Cl.
*G05D 1/06* (2006.01)
*G05D 1/08* (2006.01)
*G06F 19/00* (2006.01)
*B64C 13/00* (2006.01)
*B64C 13/12* (2006.01)

(52) U.S. Cl. ............. 701/5; 701/8; 701/14; 244/76; 244/194; 340/974; 340/975

(58) Field of Classification Search .............. 701/1, 4, 701/3, 5, 7, 9, 11, 14, 29, 8; 244/75.1, 76 R, 244/175, 184, 177, 194, 213; 340/945, 963, 340/964, 971, 974, 970, 975
See application file for complete search history.

(56) References Cited

U.S. PATENT DOCUMENTS

| | | | |
|---|---|---|---|
| 4,884,205 A * | 11/1989 | Hernandez-Diaz ............. 701/99 |
| 5,365,446 A | 11/1994 | Farineau | |
| 6,102,330 A * | 8/2000 | Burken et al. ............. 244/76 R |
| 6,126,111 A * | 10/2000 | Burcham et al. ............ 244/76 R |
| 6,196,499 B1 * | 3/2001 | Kahler ......................... 244/75.1 |
| 6,282,466 B1 * | 8/2001 | Nolte et al. .................... 701/11 |
| 6,453,221 B2 * | 9/2002 | Burson ............................. 701/3 |

FOREIGN PATENT DOCUMENTS

| | | |
|---|---|---|
| EP | 0 296 951 | 12/1988 |
| EP | 0 999 485 | 5/2000 |
| FR | 2 753 171 | 3/1998 |
| FR | 2 879 561 | 6/2006 |

\* cited by examiner

*Primary Examiner* — Tuan C. To
*Assistant Examiner* — Edward Pipala
(74) *Attorney, Agent, or Firm* — Dickinson Wright PLLC

(57) ABSTRACT

The device includes a calculation unit to automatically calculate an overall thrust moment of the engines which represents a thrust asymmetry of the engines of a multi-engine aircraft, a determination unit to automatically determine, using this overall moment, a maximum roll rate, and a limiting unit to automatically limit a roll command using this maximum roll rate.

10 Claims, 3 Drawing Sheets

METHOD AND DEVICE FOR LIMITING THE ROLL COMMAND OF AN AIRCRAFT AS A FUNCTION OF A THRUST ASYMMETRY

TECHNICAL FIELD OF THE INVENTION

The present invention relates to a method and a device for managing the roll piloting of a multi-engined aircraft, in particular a multi-engined transport aircraft.

BACKGROUND OF THE INVENTION

In normal operation, an aircraft which is equipped with several engines is propelled by the generation of a symmetrical thrust over its various engines, that is to say a thrust which is such that the resultant moment of the propulsion forces about a vertical axis (with respect to the aircraft) is zero. Thus, a maneuvering capability in yaw (about the vertical axis) which is identical to the left and to the right is guaranteed, the yaw control being implemented by deflecting the rudder of the aircraft.

Moreover, the orientation of the aircraft's path in the horizontal plane is carried out by the inclination of the lift. This inclination is achieved more or less rapidly and necessitates a contribution from the rudder in order to guarantee a low or even zero sideslip. The speed of inclination is a determinant parameter for the deflection amplitude necessary for the rudder.

In the case of a failure or reduction of the thrust of one or more engines of the aircraft, the aforesaid condition of symmetry of the thrust of the engines is no longer achieved. Thus, in order to maintain symmetrical flight, it is then necessary to implement a rudder deflection which compensates for the yaw moment of the propulsion forces which, when the aircraft is put into a turn, is added to the deflection intended for maintaining zero sideslip during this maneuver. The consequence of this is:

either to cause to a large increase in the aerodynamic loads undergone by the structure of the rear parts (tail, vertical stabilizer, etc.) of the aircraft during this maneuver;

or, if the rudder stop is reached before the yaw requirement is fully met, to cause a high degree of sideslip, which reduces the safety margins and also causes a high structural load level due to sideslip.

From the document FR-2 753 171, there is known a device for controlling the thrust of a multi-engined aircraft during a thrust asymmetry due to the failure of an engine of the aircraft.

Moreover, from the document FR-2 879 561, there is known a particular method for improving the roll piloting of an aircraft, this method in particular using means for generating a roll command.

SUMMARY OF THE INVENTION

The present invention relates to a method of managing the roll piloting of a multi-engined aircraft, which makes it possible to overcome the aforesaid disadvantages.

According to the invention, said method according to which a roll command is generated is noteworthy in that the following series of operations is additionally and automatically carried out:

a) on each of the engines of the aircraft, the value of a parameter representative of the thrust of said engine is measured;

b) the different values thus measured are each converted into an effective thrust value;

c) from the different effective thrust values thus obtained, there is calculated an overall thrust moment of the engines about a vertical axis of the aircraft, said overall moment representing a thrust asymmetry of the engines of the aircraft if one exists;

d) using said overall moment, there is determined a maximum roll rate; and e) said roll command is limited using said maximum roll rate.

Thus, due to the invention, said roll command, generally a roll rate, is limited as a function of the thrust asymmetry actually present on the aircraft. This makes it possible to avoid the aforesaid heavy structural loads and also the aforesaid excursions into sideslip.

The present invention allows an aircraft to retain all of its maneuverability in the approach phase, during which the thrust (or propulsion) asymmetry is low, and to reduce the latter solely when the thrust asymmetry is high, which corresponds to flight cases in which the overloading of the rear parts (tail, vertical stabilizer, etc.) of the aircraft is high, whereas the roll maneuverability requirements are much lower.

Advantageously, in a step 0, said roll command such as limited in step e) is applied to at least one usual means of controlling the roll of the aircraft.

In the context of the present invention, in step a), it is possible to provide different variants of embodiment, in particular:

it is possible to measure, for each engine, the value of the speed of the low pressure stage of said engine; or it is possible to measure, for each engine, the position of the corresponding control lever; or it is possible to take account of any transmitted fault information relating to said engines of the aircraft.

In a preferred embodiment, in step d):

there is taken into account a load level reached on the rear structure of the aircraft, which depends on the roll and on the thrust asymmetry. This load level is calculated previously during the design of a device intended for implementing said method; and there is selected, as the maximum roll rate, that which represents the maximum load level for a thrust asymmetry corresponding to said calculated overall moment.

In the case where the method according to the invention is applied to an aircraft with electric flight controls, said roll command is advantageously expressed in the form of a roll rate and, in step e), this roll rate is limited, if necessary, directly to said maximum roll rate value.

Moreover in the case where the method according to the present invention is applied to an aircraft with manual flight controls, there is advantageously calculated, in step e), a limit deflection value $\delta l max$ of the banking control surfaces intended to act on the roll of the aircraft. This limit deflection value $\delta l max$ is calculated using the following expression:

$$\delta l max = (K/V) \cdot p max$$

in which:

K is a predetermined gain;

V is an aerodynamic speed of the aircraft; and pmax is said maximum roll rate determined in step d), said limit deflection value $\delta l max$ thus calculated being applied to adjustable stops of said banking control surfaces, which makes it possible to limit the deflection of the latter and therefore the roll command if it requires a deflection going beyond this limit.

The present invention also relates to a device for the automatic management of the roll piloting of a multi-engined aircraft, in particular of a multi-engined transport aircraft.

For this purpose, according to the invention, said device of the type comprising means for generating a roll command, in particular a roll rate, is noteworthy in that it additionally comprises:

means for automatically measuring, on each of the engines of the aircraft, the value of a parameter representative of the thrust of said engine;

means for automatically converting each of said values thus measured into an effective thrust value;

means for automatically calculating, from the different effective thrust values thus obtained, an overall thrust moment of the engines about a vertical axis of the aircraft, said overall moment representing a thrust asymmetry of the engines of the aircraft if one exists;

means for automatically determining, using said overall moment, a maximum roll rate; and means for automatically limiting said roll command using said maximum roll rate.

Moreover, in a particular embodiment, said device additionally comprises at least one roll control system of the aircraft.

BRIEF DESCRIPTION OF THE DRAWINGS

The figures of the appended drawing will give a good understanding of how the invention may be embodied. In these figures, identical references denote similar elements.

DETAILED DESCRIPTION OF THE INVENTION

Figure 1:
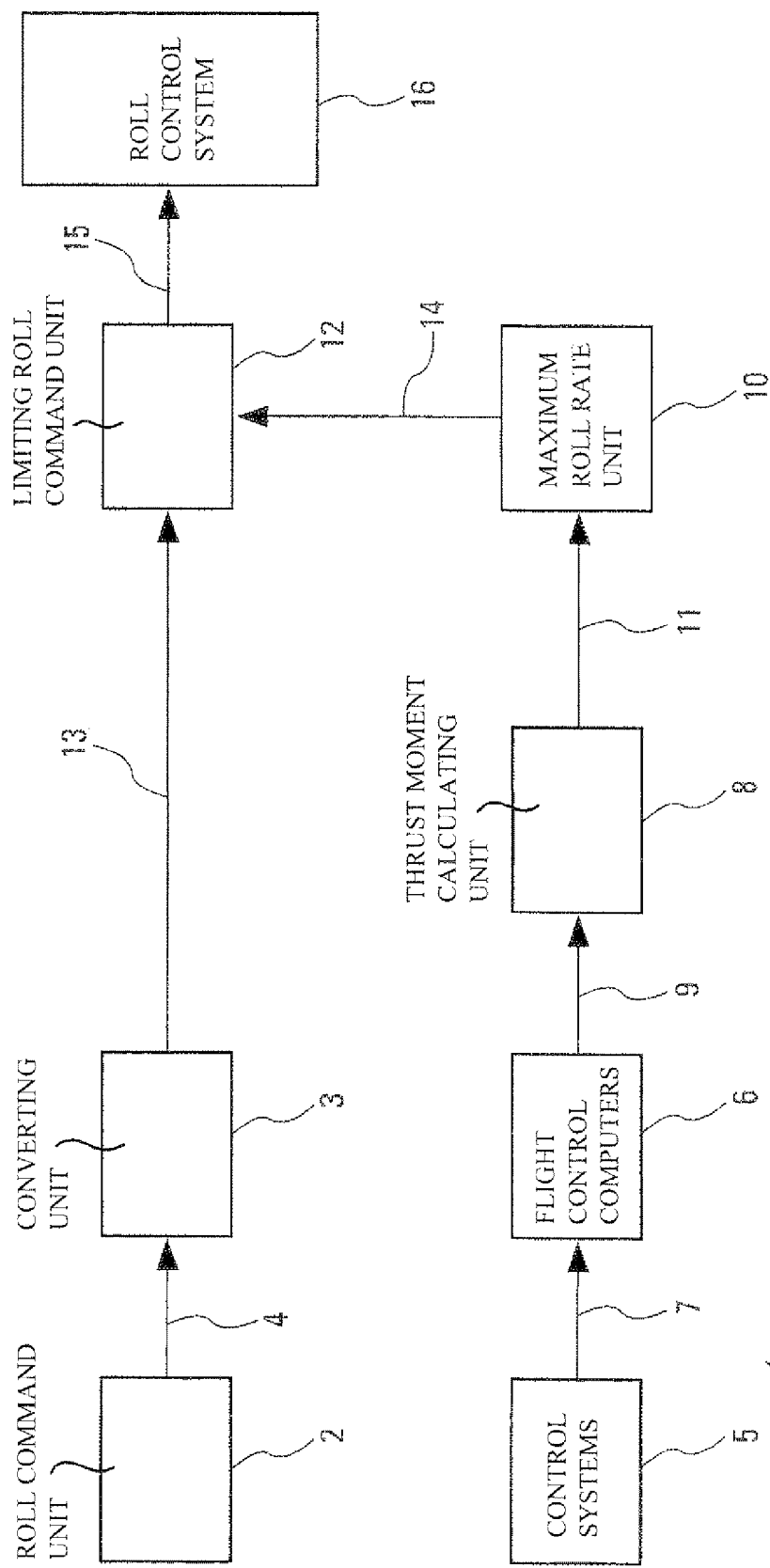
FIG. 1 is the block diagram of a device according to the invention.

The device 1 according to the invention and shown as a block diagram in FIG. 1 is intended for assisting the pilot of a multi-engined aircraft (not shown), in particular a multi-engined transport aircraft, to manage the roll piloting of said aircraft.

In order to do this, said device 1 comprises, in particular, means 2 which comprise, for example, a control stick, and which are capable of generating a roll command. These means 2 can also comprise usual means which determine said roll command automatically using measured values.

In a preferred embodiment, said device 1 additionally comprises means 3 which are connected by the intermediary of a link 4 to said means 2 and which are intended to convert, in a usual manner, a roll command generated by said means 2, into a commanded roll rate. This preferred embodiment is in particular used on an aircraft with electric flight controls. However, any possible usual use of the roll command (generated by said means 2) can be envisaged in the context of the present invention.

According to the invention, said device 1 additionally comprises:

means 5 for automatically measuring, in a usual manner, on each of the n engines of the aircraft (n being an integer greater than 1), the value of a parameter specified below, which is representative of the thrust of the corresponding engine;

means 6 which are connected by the intermediary of a link 7 to said means 5 and which are produced in such a way as to convert each of the different values measured by said means 5 (that is to say the values measured on each of the engines of the aircraft) into an effective thrust value. A number n of effective thrust values is thus obtained;

means 8 which are connected by the intermediary of a link 9 to said means 6 and which are produced in such a way as to calculate automatically, from the n effective thrust values received from said means 6, an overall thrust moment of the engines about a vertical axis of the aircraft. This overall moment results from the propulsion forces about this vertical axis with respect to the aircraft. This overall moment represents a thrust asymmetry, if one exists, of the engines of said aircraft;

means 10 which are connected by the intermediary of a link 11 to said means 8 and which are produced in such a way as to determine, using said overall moment received from said means 8, a maximum roll rate and to do this in the manner described below; and means 12 which are connected by the intermediary of links 13 and 14 respectively to said means 3 and 10 and which are produced in such a way as to limit the roll command received from said means 2 (and converted in the example of FIG. 1 into a roll rate by the intermediary of said means 3) using said maximum roll rate received from said means 10. Said means 12 therefore transmit at their output, by the intermediary of a link 15, a roll command which is, if necessary, limited using said maximum roll rate.

Consequently, the device 1 according to the invention limits, if necessary, said roll command, generally a roll rate, with respect to a previously calculated maximum roll rate, that is to say according to an overall thrust moment which represents the thrust asymmetry which is actually present on the aircraft. Any roll command generated in the usual manner is therefore limited, according to the invention, in the case of thrust asymmetry, according to this thrust asymmetry. This makes it possible to avoid heavy structural loads and excursions into sideslip, which would exist in the absence of such a limitation, in the case of a failure or reduction of the thrust of one or more engines of said multi-engined aircraft.

The device 1 according to the invention thus allows an aircraft, in particular a transport aircraft:

to retain all of its maneuverability in the approach phase (for the purpose of a landing at an airport), during which the thrust (or propulsion) asymmetry is low; and to reduce its maneuverability solely when the thrust asymmetry is high, which corresponds to flight cases such as a cruise phase, for which the overloading of the rear parts (tail, vertical stabilizer, etc.) of the aircraft is high, but for which the roll maneuverability requirements are much lower.

In a preferred embodiment, said device 1 additionally comprises a usual roll control system 16 of the aircraft. In the case of a transport aircraft, this system 16 can in particular comprise banking control surfaces (not shown) which are designed to act on the roll of the aircraft and actuators for these banking control surfaces, as well as, if necessary, shaping means for shaping the roll command (commanded and limited) received from said means 12 before transmitting it to said actuators.

In a preferred embodiment, said means 5 comprise, for example, a plurality of full authority digital control systems of the FADEC ("Full Authority Digital Engine Control") type, which are each associated with a particular engine of the aircraft and each of which measures the value N1 of the speed of the low pressure stage of the associated engine. In this particular embodiment, said means 6 can comprise primary flight control computers of the PRIM type, each of which is associated with a FADEC system and which calculate, in the usual manner, from the values N1 received from the different associated FADEC systems, a thrust representing the maximum thrust that the engine is capable of supplying at that speed value N1, and to do this no matter what the altitude and temperature may be. In practice, the thrust thus calculated is close to the thrust actually delivered by the engine. That is why the device 1 uses this thrust thus calculated as the effective thrust value.

It will be noted that the measurement of the speed N1 of the engines can be supplemented by the aerodynamic speed, the altitude and the temperature, in order to produce a more accurate estimation of the effective thrust.

Alternatives to the use of the speed N1 consist in particular in using engine parameters indicating the presence of thrust asymmetry, and in particular:

the positions of the engine control levers; or
engine fault data.

Figure 2:
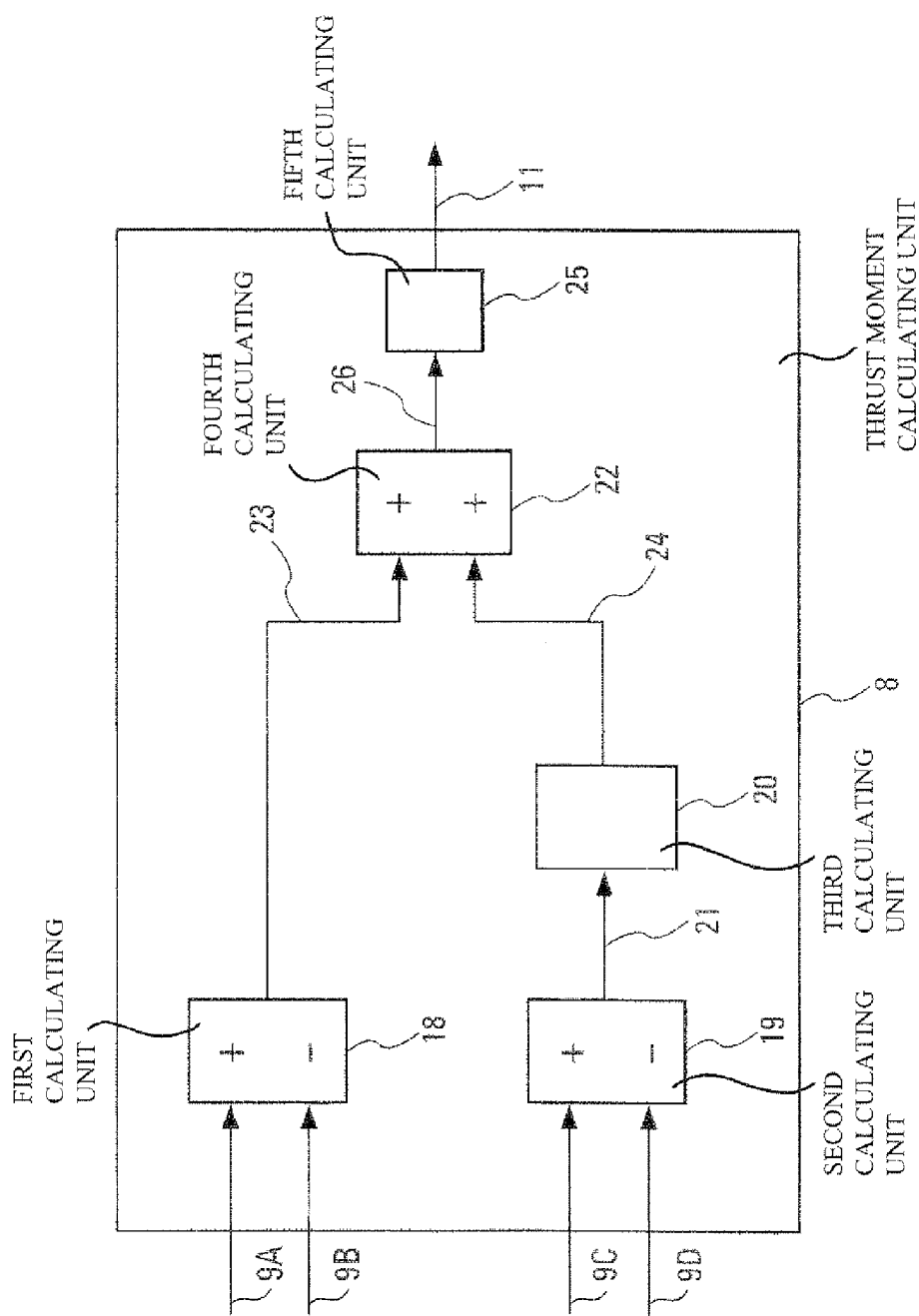
FIG. 2 is a diagrammatic illustration of a particular calculating means of a device according to the invention.

Moreover, in a particular embodiment shown in FIG. 2 and applied to a four-engined aircraft, said means 8 which calculate an overall thrust moment of the engines representing a thrust asymmetry, if one exists, can comprise:

a calculating means 18 which calculates the difference between the effective thrust value corresponding to the outer left engine and received by the intermediary of a link 9A and the effective thrust value corresponding to the outer right engine and received by the intermediary of a link 9B;

a calculating means 19, which produces the difference between the effective thrust value corresponding to the inner left engine and received by the intermediary of a link 9C and the effective thrust value corresponding to the inner right engine and received by the intermediary of a link 9D;

a calculating means 20 which is connected by the intermediary of a link 21 to said calculating means 19 and which multiplies the difference calculated by said calculating means 19 by a coefficient K which is such that K=Y1/Y2. Y1 and Y2 represent the values of the lever arms of the engines with respect to the center of gravity in the horizontal plane, that is to say the lateral positions of the engines, for an inner engine and an outer engine respectively. This makes it possible to obtain a magnitude homogeneous with a moment about the vertical axis;

a calculating means 22 which is connected by the intermediary of links 23 and 24 respectively to said calculating means 18 and 20 and which produces the sum of the results of the calculations implemented by these calculating means 18 and 20; and a calculating means 25 which is connected by the intermediary of a link 26 to said calculating means 22, which calculates the absolute value of the sum received from said calculating means 22, and which transmits this absolute value (representing said overall moment) by the intermediary of the link 11 to said means 10.

Said links 9A, 9B, 9C and 9D are part of the link 9 shown in FIG. 1. in a particular embodiment, these four links 9A to 9D are each connected to one of the FADEC PRIM computers of the four engines of the four-engined aircraft in question.

Figure 3:
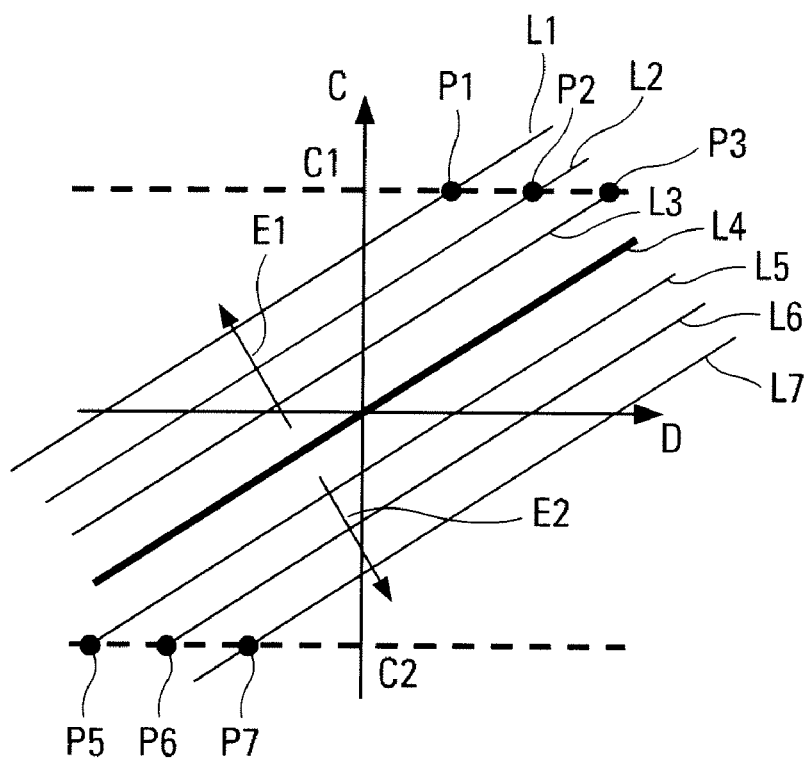
FIGS. 3 and 4 are graphs making it possible to correctly explain the calculation of a maximum roll rate, carried out according to the invention.
Figure 4:
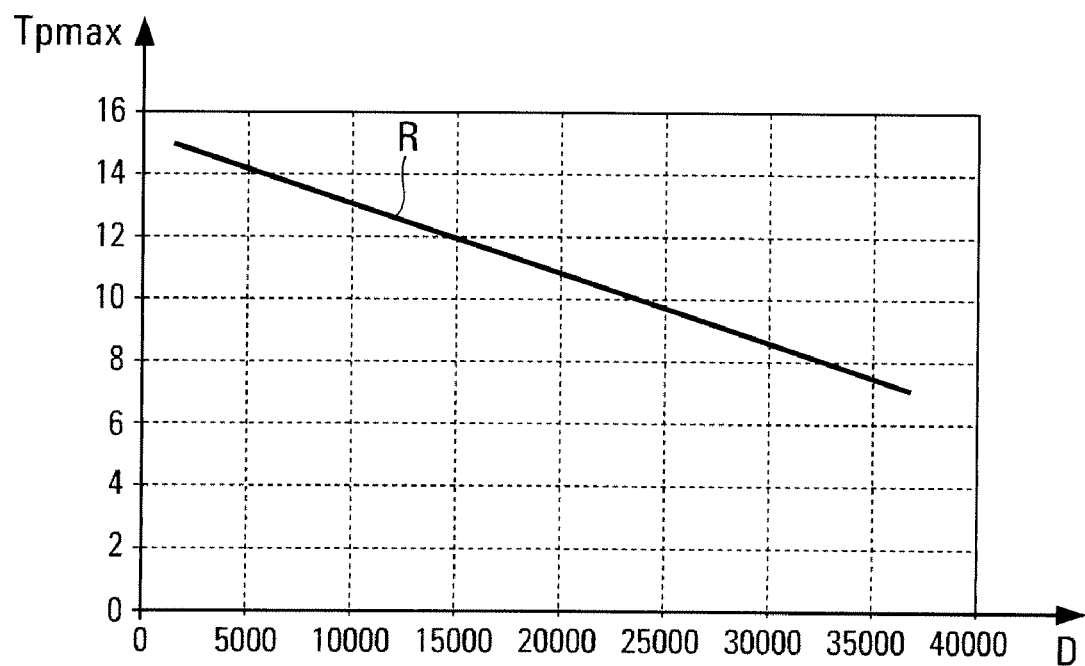

Moreover, FIGS. 3 and 4 make it possible to explain correctly how the means 10 determine the maximum roll rate Tpmax from the overall moment calculated by the means 8.

For a given thrust asymmetry or a given overall moment, the maximum roll rate acceptable by the structure of an aircraft is obtained on analyzing by simulation the load level reached during a maneuver in which a turn is entered into. The maximum roll rate is that which leads to the maximum acceptable load level. FIG. 3 shows, in the horizontal direction, the thrust asymmetry D and, in the vertical direction, the loads C generated on the rear parts of the structure of the aircraft. Straight lines L1 to L7 illustrating different roll values are also shown. The straight line L4 corresponds to a zero roll, the straight lines L3 to L1 correspond to a roll increasing towards the right, this increase being illustrated by an arrow E1, and the straight lines L5 to L7 correspond to a roll increasing towards the left, this increase being illustrated by an arrow E2. The maximum loads C1 and C2 which the structure is allowed to undergo are also shown in dashed line. From these maximum loads C1 and C2 and from said straight lines L1 to L7, pairs illustrated by the points P1, P2, P3, P5, P6 and P7 in FIG. 3 are obtained.

These latter points therefore each illustrate a pair of thrust asymmetry and maximum roll rate values, making it possible to obtain the curve R shown in FIG. 4 (shown by way of example) which provides the maximum roll rate Tpmax (expressed in degrees/s) as a function of the thrust asymmetry D (expressed in N.m).

Thus, from the curve R, the means 10 can determine directly (in real time) the maximum roll rate Tpmax, as a function of the calculated overall moment which corresponds to a particular value (possibly zero) of the thrust asymmetry D.

It will be noted that the pairs (engine yaw moment, maximum roll rate) are obtained by temporal simulation of roll maneuvers on a simulation tool which is representative of the flight mechanics and of the loads. For a given level of thrust asymmetry, several simulations are carried out by modifying the amplitude of the roll commands (modulation of the commanded roll rate). The simulator comprises a load model which makes it possible to ascertain the load level reached during the maneuver. Each simulation therefore provides a point on the graph in FIG. 4. This operation is repeated as many times as necessary in order to obtain the graph of FIG. 4.

The maximum roll rate thus derived by said means 10 from the thrust asymmetry is used by the means 12 for limiting the roll command.

In the context of a so-called roll rate piloting law (of the electric flight controls type), this limitation is carried out directly by the means 12, that is to say they limit the commanded roll rate to said maximum roll rate directly if it is greater than the latter (and solely in this case).

On the other hand, in the context of a conventional roll law (with banking control surface elevations tied to the roll commands by kinematics), it is possible to obtain the same result (limitation of the roll rate), either by saturating the commanded deflections of said control surfaces, or by limiting the banking commands sent by the means 2. In these two cases, it is necessary to use the aerodynamic speed, because it is involved in the exchange rate between a given deflection of the banking control surfaces and the resultant roll rate. In order to do this, the means 12 carry out a limitation of the deflection of the banking control surfaces by calculating a limit deflection value $\delta lmax$ of said banking control surfaces (intended to act on the roll of the aircraft). This limit deflection value $\delta lmax$ is calculated using the following expression:

$$\delta lmax = (K/V) pmax$$

in which:

K is a predetermined gain;
V is the measured aerodynamic speed of the aircraft; and
pmax is said maximum roll rate determined by said means 10.

This limit deflection value δlmax is then applied to adjustable stops of said banking control surfaces, which makes it possible to limit the deflection of the latter and therefore the commanded roll command if it demands a deflection going beyond this limit value.

The device 1 according to the present invention applies whatever the number of engines installed on a multi-engined aircraft may be. Moreover, it applies equally well to a piloting law which explicitly commands a roll rate as to a usual banking control.

The device 1 according to the invention makes it possible to maintain the structural loads and the sideslip at the required level during a flight with one or more failed engines, and it does this without the pilot having to implement a piloting command difficult to gauge and without the roll maneuverability with a slight asymmetry being affected.

The invention claimed is:

1. A method for automatically managing roll piloting of a multi-engine aircraft, according to which method a roll command is generated, comprising:
    a) measuring on each of the engines of the aircraft, a value representative of a thrust of each engine;
    b) converting each of the measured values into an effective thrust value for each engine;
    c) calculating, from each of the effective thrust values, an overall thrust moment about a vertical axis of the aircraft, said overall thrust moment representing thrust asymmetry of the aircraft;
    d) determining a maximum roll rate from the overall thrust moment, accounting for load level of a rear structure of the aircraft, in which the load level is based on roll rate and the thrust asymmetry, wherein the maximum roll rate corresponds to a maximum load level for the thrust asymmetry; and
    e) limiting said roll command using said maximum roll rate.

2. The method as claimed in claim 1, further comprising f) applying said roll command to at least one roll control system of the aircraft.

3. The method as claimed in claim 1, wherein, in step a), for each engine, a value of a speed of the low pressure stage of said engine is measured.

4. The method as claimed in claim 1, wherein, in step a), for each engine, a position of a corresponding control lever is measured.

5. The method as claimed in claim 1, wherein, in step a) transmitted fault information relating to said engines of the aircraft is received.

6. A method for automatically managing roll piloting of a multi-engine aircraft, according to which method a roll command is generated, comprising:
    a) measuring on each of the engines of the aircraft, a value representative of a thrust of each engine;
    b) converting each of the measured values into an effective thrust value for each engine;
    c) calculating, from each of the effective thrust values, an overall thrust moment about a vertical axis of the aircraft, said overall thrust moment representing thrust asymmetry of the aircraft;
    d) determining a maximum roll rate from the overall thrust moment, accounting for load level of a rear structure of the aircraft, in which the load level is based on roll rate and the thrust asymmetry, wherein the maximum roll rate corresponds to a maximum load level for the thrust asymmetry; and
    e) limiting said roll command using said maximum roll rate, wherein
    for an aircraft with electric flight controls, said roll command is expressed in a form of a roll rate and wherein, in step e), the roll rate is limited directly to said maximum roll rate.

7. A method for automatically managing roll piloting of a multi-engine aircraft, according to which method a roll command is generated, comprising:
    a) measuring on each of the engines of the aircraft, a value representative of a thrust of each engine;
    b) converting each of the measured values into an effective thrust value for each engine;
    c) calculating, from each of the effective thrust values, an overall thrust moment about a vertical axis of the aircraft, said overall thrust moment representing thrust asymmetry of the aircraft;
    d) determining a maximum roll rate from the overall thrust moment, accounting for load level of a rear structure of the aircraft, in which the load level is based on roll rate and the thrust asymmetry, wherein the maximum roll rate corresponds to a maximum load level for the thrust asymmetry; and
    e) limiting said roll command using said maximum roll rate, wherein
    for an aircraft with manual flight controls, calculating, in step e), a limit deflection value δlmax of banking control surfaces is configured to act on the roll of the aircraft, using the following expression: δlmax=(K/V).pmax
    in which:
    K is a predetermined gain;
    V is an aerodynamic speed of the aircraft; and
    pmax is said maximum roll rate determined in step d), said limit deflection value calculated being applied to adjustable stops of said banking control surfaces.

8. A device for management of roll piloting of a multi-engine aircraft upon generating a roll command, comprising:
    control system that automatically measures , on each engine of the aircraft, a value representative of a thrust of each engine;
    flight control computer that converts each of said measured values into an effective thrust value;
    thrust moment calculating unit that automatically calculates, from the effective thrust values obtained for each engine, an overall thrust moment about a vertical axis of the aircraft, said overall thrust moment representing a thrust asymmetry of the aircraft;
    maximum roll rate unit that automatically determines a maximum roll rate from the overall thrust moment, accounting for load level of a rear structure of the aircraft, in which the load level is based on roll rate and the thrust asymmetry, wherein the maximum roll rate, corresponds to a maximum load level for the thrust asymmetry; and
    maximum roll rate unit that automatically limits said roll command using said maximum roll rate.

9. The device as claimed in claim 8, further comprising at least one roll control system of the aircraft.

10. An aircraft, further comprising the device of claim 8.

* * * * *